Dec. 8, 1953     U. GÜNTHER     2,662,153
METHOD AND DEVICE FOR WELDING WIRES ON METAL BODIES
Filed Aug. 31, 1951     2 Sheets-Sheet 1

Dec. 8, 1953  U. GÜNTHER  2,662,153
METHOD AND DEVICE FOR WELDING WIRES ON METAL BODIES
Filed Aug. 31, 1951.  2 Sheets-Sheet 2

INVENTOR.
BY Ulrich Günther
Armand E. Martin
ATTORNEY

Patented Dec. 8, 1953

2,662,153

UNITED STATES PATENT OFFICE 2,662,153

METHOD AND DEVICE FOR WELDING WIRES ON METAL BODIES

Ulrich Günther, Domat (Ems), Switzerland, assignor to Inventa A. G. für Forschung und Patentverwertung, Zurich, Switzerland Application August 31, 1951, Serial No. 244,615

2 Claims. (Cl. 219—10)

This invention relates to improvements in the art of welding wires, and particularly thin wire, on metallic bodies.

The problem of welding thin wires on metallic bodies, either for making a current carrying bridge or for connecting metal parts with one another, presents itself frequently in the art of electrotechnics. There are certain difficulties which commonly arise in working with thin wires, more particularly thin incandescent wires. The work is quite strenuous and is a particular strain on the eyes of the operator; it is, moreover, time consuming and involves substantial loss in wire. Another difficulty consists in placing the thin wire in every instance at the correct spot underneath the welding electrode, especially in view of the fact that these wires have a marked tendency of curling up.

It is the object of the present invention to overcome the above-mentioned difficulties in welding methods and means hitherto in use.

It is a further object to provide a method and means which permit the welding of thin wires so as to facilitate the accurate positioning of the wire to be welded.

It is yet another object of the present invention to provide a welding method and means for carrying it out, wherein the strain on the operator is substantially diminished.

A still further object of the invention is to dispense with the holding of the wire ends during the operation.

Finally, it is an object of the present invention to decrease the losses in wire to an extent where they become practically negligible.

Other objects and advantages of the present invention will be apparent from the following specification.

The above mentioned objects can be achieved, according to the present invention, by arranging the metal bodies on a rotatable disk in a circle, so as to be adjacent to, but insulated from, each other, while the wire to be welded is payed out from a reel and is made to contact the circle tangentially at the spot lying accurately below the welding electrode.

The invention is illustrated in the accompanying drawing, in which.

Figure 1:
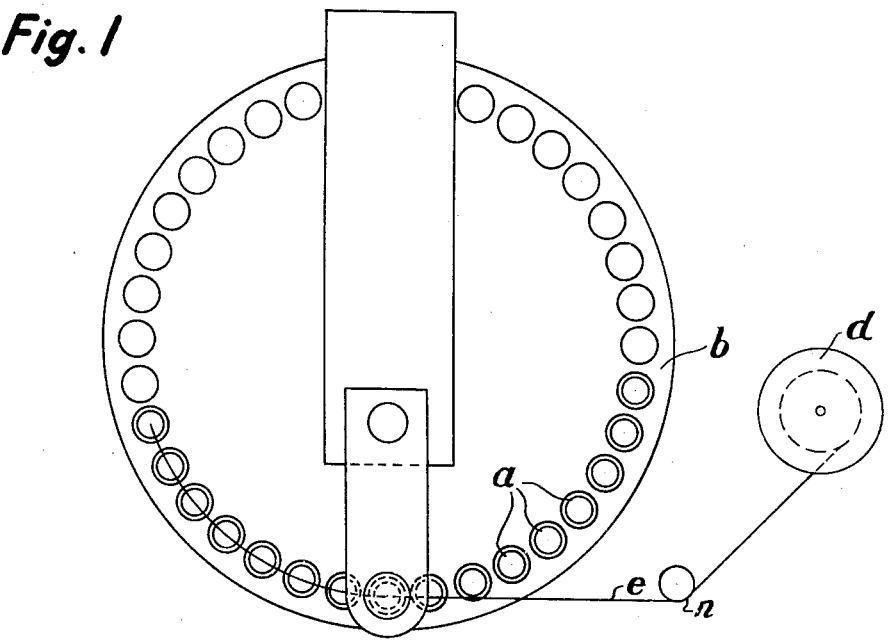
Figure 1 is a diagrammatic view of the device according to the invention.
Figure 2:
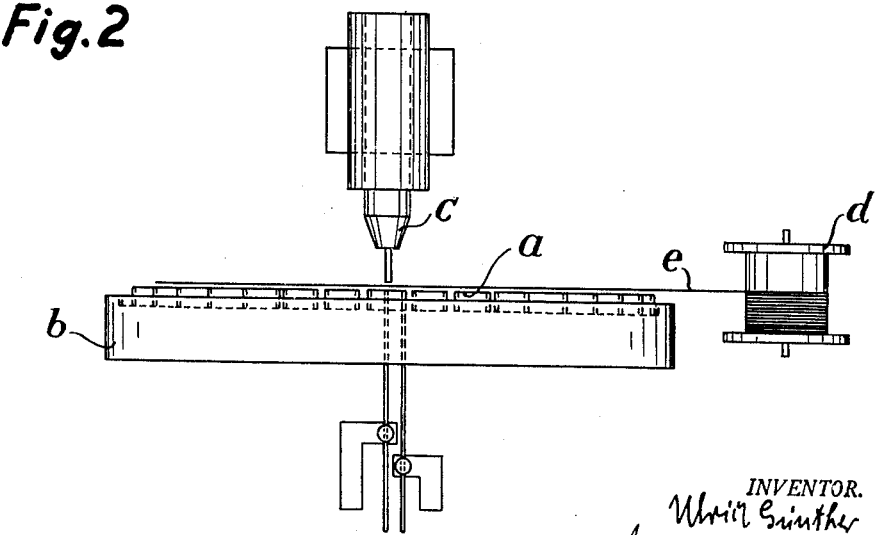
Fig. 2 is the same device in side elevation.

Referring particularly to Figs. 1 and 2, the metal bodies or pole supports, for the wires are designated by $a$; they have a plane surface, onto which the wire is welded, and are arranged in a circle, closely together, but insulated from each other, on a disk $b$. The disk is made of insulating material and is rotatably mounted. For carrying out the welding operation, an electrode, which is movable in vertical direction only, but fixed horizontally, is provided; thus, when the disk $b$ is rotated and adjusted underneath, the electrode will always hit the same spot on the different pole supports.

A reel $d$ carries the incandescent wire $e$, which is uncoiled therefrom and conveyed by means of a guide roll $n$ to the disk $b$ in such a manner that it meets the pole support $a$ which happens at that time to be below electrode $c$; the guide roll $n$ is so positioned that it will direct the wire to contact the circle of supports tangentially.

In operation, the electrode $c$ descends toward the pole support underneath and welds the wire $e$ thereto. The disk $b$ is then rotated so as to bring the next pole support below the electrode, whereupon welding is, again, performed. This continues, until all the pole supports on a disk $b$ have been provided with wire. The pole supports are then replaced by new ones on disk $b$ and the operation of welding wires to supports can be continued, with rotation of disk $b$, until all the wire from reel $d$ has been used up.

In the welding operation, the pole support itself is used as second electrode. Should this pole support have two poles on its surface, which are connected by the wire, it is necessary to connect in the welding circuit, as a second electrode, that pole onto which the wire is to be welded and which is below the welding electrode $c$. It has to be watched that the other pole on the same support, or the poles on the neighboring pole supports are not connected to the second electrode, since otherwise part of the welding current would flow through the wire and would destroy it.

This can be accomplished, in accordance with the invention, for instance by providing two contact switches for connecting the poles to the second electrode and by actuating one switch at a time, namely, at each moment the switch that connects the pole underneath the welding electrode at that particular time.

Figure 3:
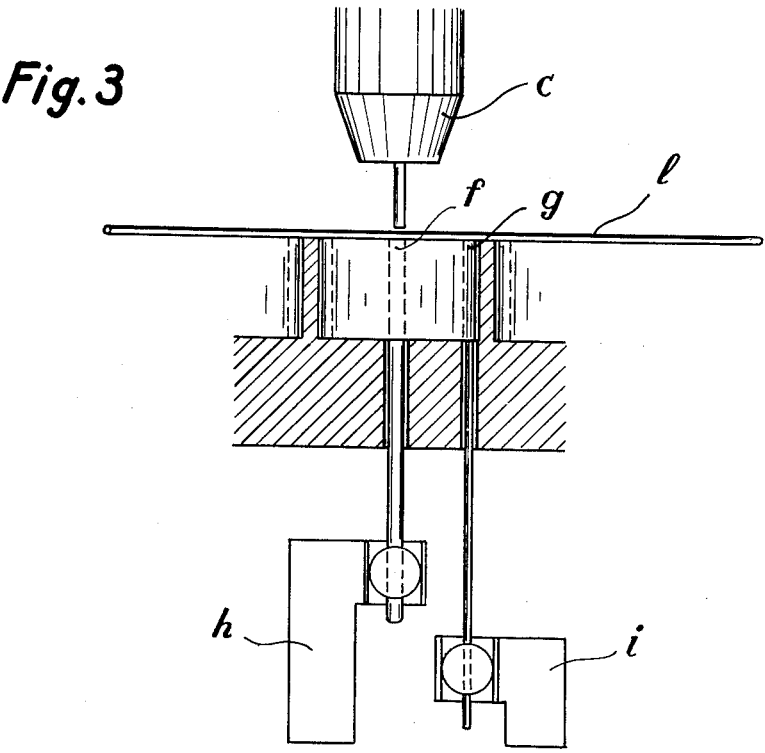
Figs. 3 and 4 illustrate some parts associated with the welding device.

Figure 3 illustrates this mode of operating and the arrangement therefor according to the invention.

In this figure, the pole support carries two concentrically disposed poles $f$ and $g$; switches are designated by $h$ and $i$, $h$ being actuated when pole $f$ is underneath the welding electrode, while switch $i$ is operated, when pole $g$ is underneath the electrode.

After the wire has been welded to the adjacent pole supports, these are still connected by the wire. In some cases, it may be desirable to sever the connection. A mechanical separation, such as cutting, requires, in pole supports of small dimensions, very accurate work with a magnifying glass, while tearing off endangers the welded spot. According to the present invention, the removal of the wire can be accomplished by connecting a source of current between the neighboring welds of two pole supports, whereby the connecting wire is fused.

Figure 4:
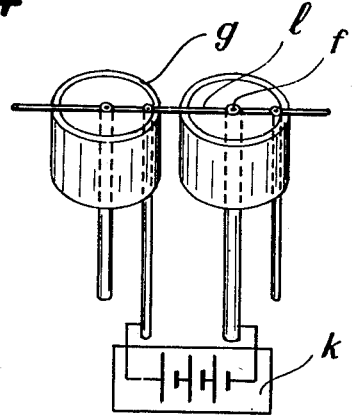

In Fig. 4, the fusing of a wire by means of a source of electric current is shown by way of example; a battery or a transformer is the source of current in this instance. $k$ designates a battery, which is connected to pole $f$ of one pole support and to pole $g$ of another pole support; the piece of wire $e$ connecting the two pole supports can be fused by this means.

While I have described and illustrated an example of carrying out my invention, it should be understood that many modifications in the procedure of operating and in the device for carrying out the novel method of welding can be made without departing from the spirit of the invention.

What I claim is:

1. A process for welding thin wires to small metal pole supporting bodies which comprises arranging said bodies in a circle closely to, but insulated from, one another, said bodies having two poles; disposing a welding electrode above said circle in a fixed relationship to a spot below said electrode but vertically movable thereto; providing switch means for connecting only the one of the poles exactly underneath the welding electrode, while leaving the other pole unconnected; making the wire meet said circle at a tangent at said spot below said electrode, and actuating said switch for welding when said pole and said electrode are in opposite positions.

2. A device for welding thin wires to small metal pole-supporting bodies which comprises a rotatable disc for arranging said bodies in a circle closely to, but insulated from, one another; said pole-supporting body having two poles arranged thereon; a welding electrode above said disk disposed in vertically movable relationship above the spot to be welded; a wire carrying reel; means for directing the wire from said reel to said disk so as to meet the spot to be welded at a tangent; two contact switches arranged below said disk, each of which is associated to one of said pole-forming spots to be welded, and an electric current for energizing said welding electrode upon actuation of one of said contact switches.

ULRICH GÜNTHER.

References Cited in the file of this patent

UNITED STATES PATENTS

| Number | Name | Date |
|---|---|---|
| 396,014 | Thomson | Jan. 8, 1889 |
| 1,889,677 | Little | Nov. 29, 1932 |
| 2,464,839 | Fairfield | Mar. 22, 1949 |
| 2,513,431 | Sell | July 4, 1950 |